United States Patent [19]

Chi

[11] Patent Number: 5,080,324

[45] Date of Patent: Jan. 14, 1992

[54] STRUCTURE OF FAUCET FOR AUTOMATIC WATER SUPPLY AND STOPPAGE

[76] Inventor: Cheng-Hsian Chi, No. 187, Tung An Rd., Ta Chia, Tai Chung, Taiwan

[21] Appl. No.: 641,769

[22] Filed: Jan. 16, 1991

[51] Int. Cl.$^5$ .............................................. F16K 31/40
[52] U.S. Cl. ............................. 251/129.04; 251/30.03; 251/44; 4/623
[58] Field of Search ................ 251/129.04, 30.03, 44; 4/623

[56] References Cited

U.S. PATENT DOCUMENTS 4,709,728 12/1987 Ying-Chung .............. 251/129.04 X
4,971,287 11/1990 Shaw ........................ 251/129.04 X

FOREIGN PATENT DOCUMENTS 1151701 7/1963 Fed. Rep. of Germany ... 251/30.03

Primary Examiner—Arnold Rosenthal
Attorney, Agent, or Firm—Fleit, Jacobson, Cohn, Price, Holman & Stern

[57] ABSTRACT

A faucet for automatic water supply and stoppage, comprising a casing having fastened therein a battery-operated two-way electromagnetic valve controlled by an infrared controller to control a water flow control assembly to stop or open a water outlet passage. The water flow control assembly comprises a movable stopper to releasably block up the water outlet passage, an elastic element disposed above the movable stopper, covered with a cover plate, and defining with the cover plate a water chamber. The cover plate has an outlet hole at the top, which is controlled to open or close by the mandrel of the electromagnetic valve and disposed in communication with the water outlet passage, and an inlet hole which is disposed in communication with the water chamber. The movable stopper defines therein a channel having one end disposed in communication with the water inlet passage and an opposite end disposed in communication with said water chamber through a through-hole made in size relatively smaller than the inlet hole of the cover plate. The infrared controller is sensed to trigger the electromagnetic valve to lift the mandrel from the outlet hole, permitting the movable stopper to be pushed toward the water chamber by intake water pressure so as to fully open the water outlet passage.

4 Claims, 5 Drawing Sheets

STRUCTURE OF FAUCET FOR AUTOMATIC WATER SUPPLY AND STOPPAGE

BACKGROUND OF THE INVENTION

In U.S. Pat. No. 4,826,129, there is disclosed a structure of faucet for automatic water supply and stoppage, in which a controller actuates a two-way electromagnetic valve to lift a mandrel, permitting the water to flow out when the user's hands are close to the front of said faucet, and the valve is capable of automatic locking and can be actuated by only an instantaneous trigger of electric energy so as to achieve the practical purpose of saving power, safety and convenience. However, the instantaneous pressure change and the suction effect resulting from speed flowing of water flow tend to pull the mandrel to displace downward, causing the outlet passage to be not fully opened. As a consequence, desired maximum water flow rate can not be achieved. If to increase the capacity of the electromagnetic valve, power consumption will be relatively increased.

SUMMARY OF THE INVENTION

The present invention has been accomplished to eliminate the aforesaid problems. In the faucet of the present invention there is provided a water flow control assembly which comprises a movable stopper to releasably block up the water outlet passage of the faucet. An elastic element is disposed above the movable stopper and covered with a cover plate which defines with the movable stopper a water chamber. The cover plate has an outlet hole at the top, which is controlled to open or close by the mandrel of an electromagnetic valve and disposed in communication with the water outlet passage of the faucet, and an inlet hole which is disposed in communication with the water chamber. The movable stopper defines therein a channel having one end disposed in communication with the water inlet passage and an opposite end disposed in communication with the water chamber through a through-hole which is made on the movable stopper in size relatively smaller than the inlet hole of the cover plate. When an infrared controller which is disposed inside the faucet at the inner bottom is sensed to trigger the electromagnetic valve, the mandrel of the electromagnetic valve is moved away from the outlet hole, permitting the movable stopper to be pushed toward the water chamber by intake water pressure, so as to fully open the water outlet passage. Therefore, maximum water flow rate is permitted to flow out of the faucet through the water outlet passage without additional power consumption.

DETAILED DESCRIPTION OF THE PREFERRED EMBODIMENT

Figure 1:
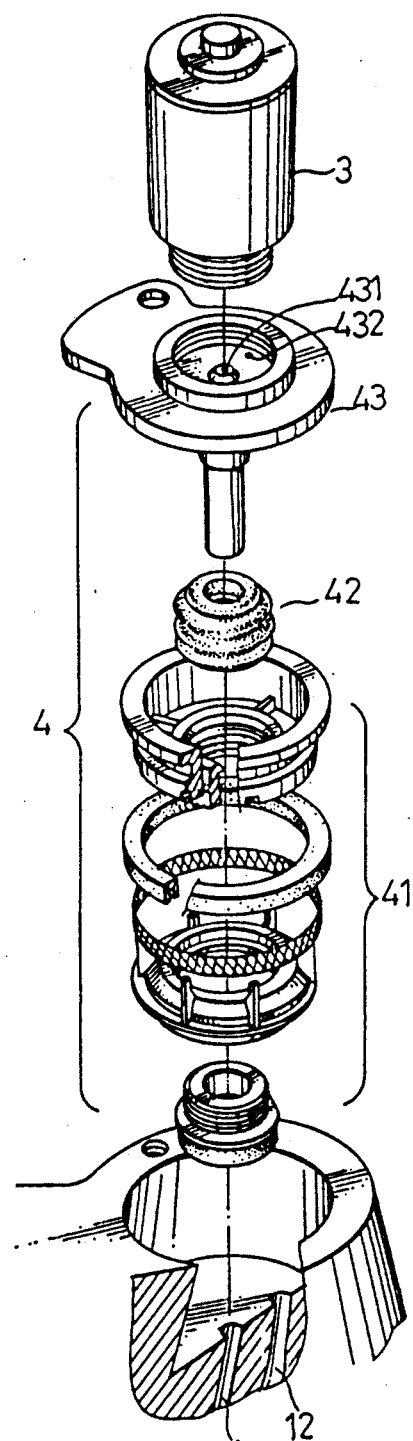
FIG. 1 is a perspective dismantled view of the preferred embodiment of the present invention.
Figure 2:
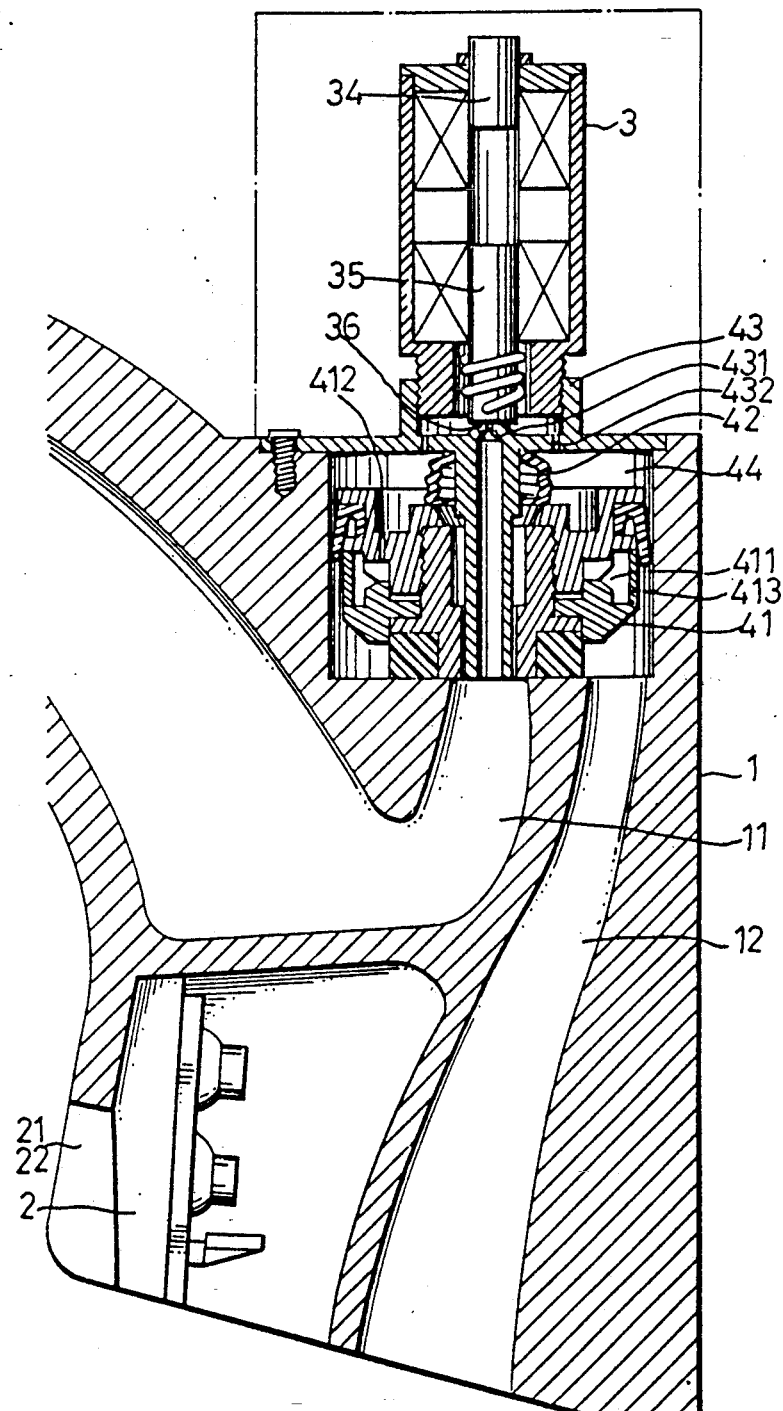
FIG. 2 is a sectional assembly view of the preferred embodiment of the present invention.
Figure 3:
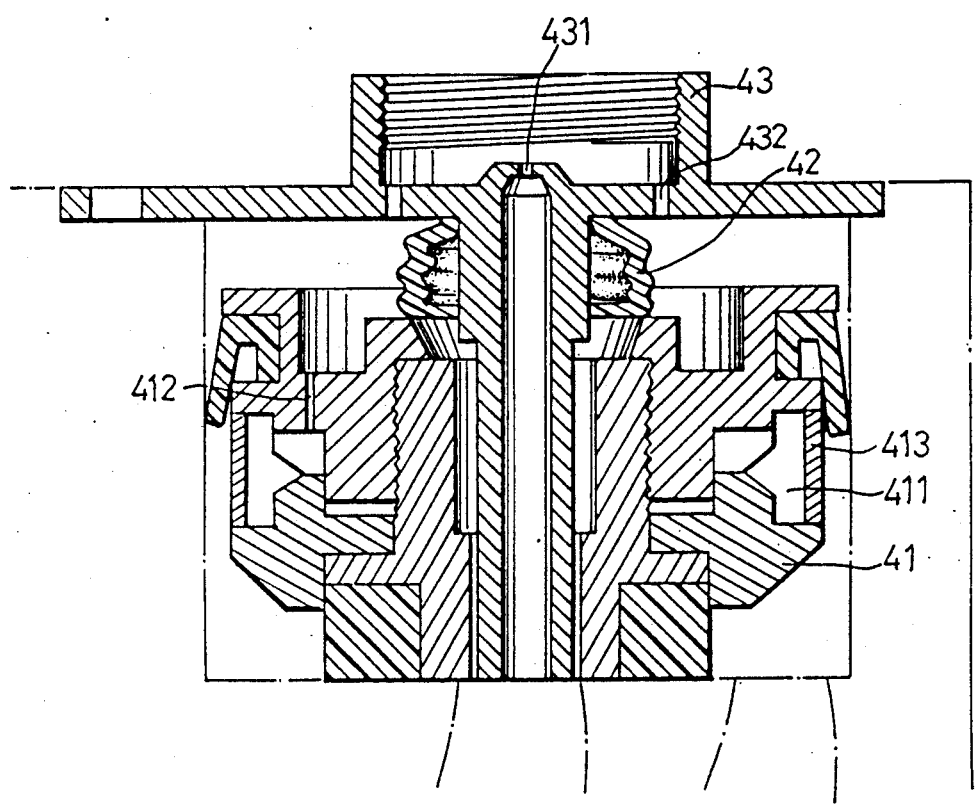
FIG. 3 is a sectional view of the water flow control assembly of the present invention.

Turning now to the annexed drawings in greater detail and referring first to FIGS. 1 and 2, therein illustrated is a faucet embodying the present invention, which is generally comprised of a casing 1, a controller 2, a battery-operated two-way electromagnetic valve 3, and a water flow control assembly 4. The controller 2 is disposed at the inner bottom of the casing 1, the infrared transmitter 21 and infrared receiver 22 of the controller 2 are toward the front to sense the present and removal of a user from in proximity to the front of the casing 1, for triggering the two-way electromagnetic valve 3 to operate. An outlet passage 11 and an inlet passage 12 are disposed in the casing 1. The water flow control assembly 4 is disposed in the casing 1 above the outlet passage 11, comprised of a movable stopper 41 at the bottom for blocking up the outlet passage 11, a cover plate 43 at the top, and an elastic element 42 squeezed in therebetween. There is a water chamber 44 defined inside the water flow control assembly 4 between the movable stopper 41 and the cover plate 43. The cover plate 43 of the water flow control assembly 4 has an outlet hole 431 on the top center and disposed in communication with the outlet passage 11, and an inlet hole 432 on the top forming passage means providing communication between the water chamber 44 and a space above the cover plate containing the valve. The movable stopper 41 defines therein a channel 411 disposed in communication with the inlet passage 12 and covered with a wire gauze filter 413. A through-hole 412 in size relatively smaller than the inlet hole 432 is made on the movable stopper at a suitable location and disposed in communication with the water chamber 44. The battery-operated two-way electromagnetic valve 3 is installed in the casing 1 above the water flow control assembly 4, for controlling a close block 36 to stop the outlet hole 431 of the water flow control assembly 4 via a mandrel 35.

Figure 4:
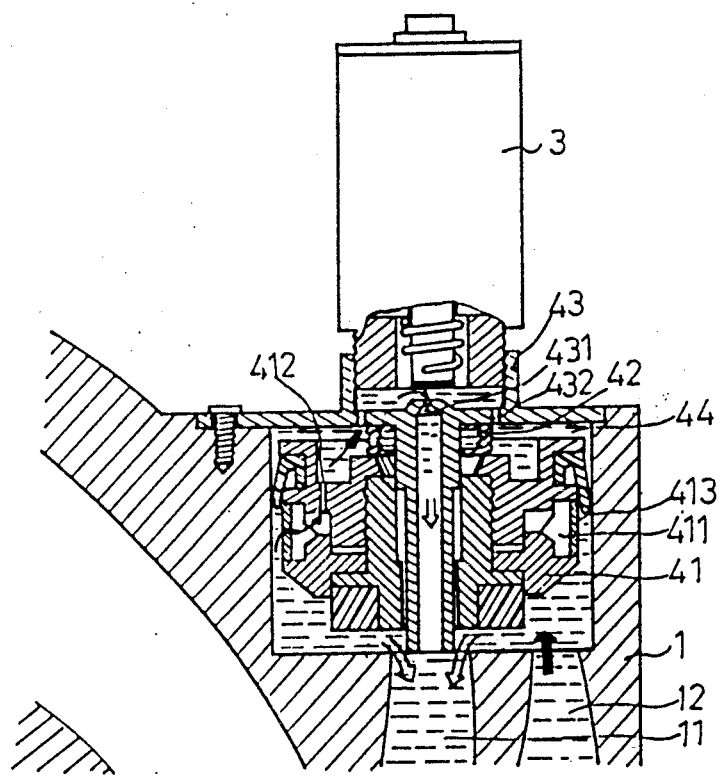
FIG. 4 is a schematic sectional view, illustrating the operation of the present invention.

The operation of the present invention is outlined hereinafter, with reference to FIG. 4. The user may put his or her hands in front of the controller 2, namely, below the outlet passage 11, so as to cause the two-way electromagnetic valve 3 to operate, permitting the mandrel 35 to be attracted in place by a permanent magnet 34, i.e., the outlet hole 431 of the water flow control assembly 4 is opened for flowing therethrough of water into the outlet passage 11. Because the flow rate from the outlet hole 431 into the outlet passage 11 is low, power consumption of the two-way electromagnetic valve is also low. At the same time, the water which comes from the inlet passage 12 through the channel 411 of the movable stopper 41 into the water chamber 44 is continuously supplied from the water chamber 44 through the inlet hole 432. Because the water flow rate through the inlet hole 432 is higher than the water flow rate through the through-hole 412, the water amount in the water chamber 44 is suddenly reduced, and the pressure inside the water chamber 44 is also relatively reduced, therefore, the movable stopper 41 is forced by the intake water pressure to lift, permitting the outlet passage 11 to be fully opened. Therefore, maximum water flow is permitted to discharge through the outlet passage without additional power consumption.

After washing, the user moves his or her hands away from the front of the infrared transmitter 21 and infrared receiver 22 of the controller 2, the mandrel 35 of the two-way electromagnetic valve 3 is forced by reversed magnetic force to move down, causing the close block 36 to block up with the outlet hole 431 of the water flow control assembly 4. Because water is continuously flowing into the water chamber 44, the pressure inside the water chamber 44 is gradually returned to normal, permitting the elastic element 42 to force the movable stopper 41 to seal the outlet passage 11, and therefore, water supply is stopped from flowing out of the faucet.

Figure 5:
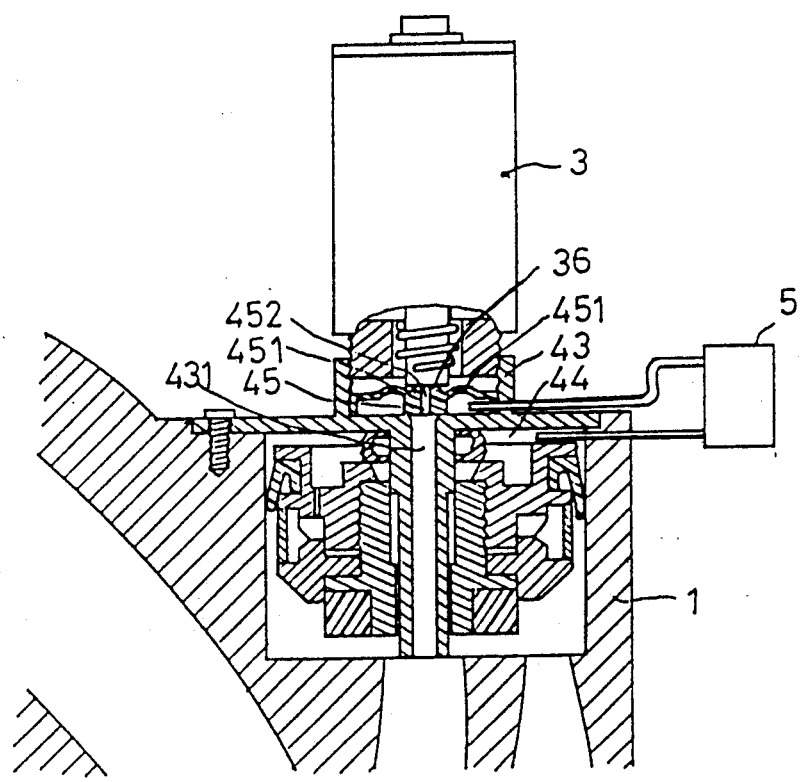
FIG. 5 illustrates an alternate form of the present invention.

Referring to FIG. 5, as an alternate form of the present invention, there isn't an inlet hole 432 on the top of the cover plate 43 as the one mentioned above, but in the space between the two-way electromagnetic valve 3 and the cover plate 43 of this embodiment, there is installed a rubber valve 45 to separate said space into upper and lower chambers. Two first inlet holes 451 are disposed in the peripheral of the rubber valve 45 so as to communicate said chambers with each other. A second inlet hole 452 in size larger than the first inlet hole 451 is disposed in the center of the rubber valve 45 and is blocked up by the close block 36 of the two-way electromagnetic valve 3. A closed outlet hole 431 is disposed in the bottom of the rubber valve 45. The chamber below the rubber valve 45 is communicated with the water chamber 44 through a pressure reducing valve 5 defining the passage means in this embodiment. At the time, when the two-way electromagnetic valve 3 is actuated to let the close block 36 lift, the rubber valve 45 will be moved upward due to the pressure reducing relationship therebetween permitting the closed outlet hole 431 to be opened. Through the operation of the pressure reducing valve 5, the pressure inside the water chamber 44 can be more accurately regulated.

What is claimed is:

1. A faucet for automatic water supply and stoppage, comprising:
   a casing, having disposed therein an infrared controller means to sense the presence and removal of a user from in proximity to the front of the faucet, a water inlet passage and a water outlet passage;
   an electromagnetic valve means including a mandrel controlled by said infrared controller to move upon and down;
   a water flow control assembly disposed in said casing above said water inlet and outlet passages, controlled to open or close said water outlet passage by said two-way electromagnetic valve means; and characterized in that:
   said water flow control assembly comprises a movable stopper to releasably block said water outlet passage, an elastic element disposed above said movable stopper, a cover plate above the elastic member, a water chamber defined between the stopper and the cover plate around the elastic member, said cover plate having an outlet hole controlled to open or close from above by said mandrel and disposed in communication with said water outlet passage, said mandrel being located to operate in a space above the cover plate passage means providing waterflow communication between said water chamber and said space, said movable stopper defining therein a channel disposed in communication with said water inlet passage directly, and in communication with said water chamber through a through-hole made in size relatively smaller than said passage means; the presence of a user from in proximity to the front of the faucet is sensed by said infrared controller means to cause said electromagnetic valve means to lift said mandrel from said outlet hole, and subsequently permitting said movable stopper to be pushed toward said water chamber by intake pressure, due to reduced pressure in said chamber caused by the size difference between said through hole and said passage means so as to fully open said water outlet passage.

2. The faucet of claim 1, wherein said channel of said movable stopper is covered with a wire gauze filter.

3. The faucet of claim 1, which further comprises a rubber valve disposed in the space between the electromagnetic valve and cover plate to separate said space into upper and lower chambers, a first inlet hole disposed in the peripheral of said rubber valve so as to communicate said chambers with each other, an outlet hole disposed in the center of said rubber valve, which is blocked up by the close block of said electromagnetic valve, a closed outlet passage disposed in the bottom of said rubber valve and wherein said passage means includes a pressure reducing valve connected between said water chamber and said lower chamber for automatically regulating the water pressure.

4. The faucet of claim 1 wherein the passage means comprises an inlet hole in the cover plate.

* * * * *